United States Patent [19]

Cronk

[11] Patent Number: 5,179,613
[45] Date of Patent: Jan. 12, 1993

[54] SELF-SUPPORTING COIL OF OPTICAL FIBER AND METHOD OF FORMING THE COIL

[75] Inventor: Bryon J. Cronk, St. Paul, Minn.

[73] Assignee: Minnesota Mining and Manufacturing Company, Saint Paul, Minn.

[21] Appl. No.: 435,351

[22] Filed: Nov. 13, 1989

[51] Int. Cl.$^5$ .................................................. G02B 6/22
[52] U.S. Cl. ..................................... 385/128; 385/141
[58] Field of Search ............... 350/96.29, 96.10, 96.15; 385/122, 147, 128, 145, 141

[56] References Cited

U.S. PATENT DOCUMENTS

| | | | |
|---|---|---|---|
| 2,973,911 | 3/1961 | Rayburn | 242/1 |
| 4,351,657 | 9/1982 | Kimura et al. | 65/3.11 |
| 4,432,607 | 2/1984 | Levy | 350/96.34 |
| 4,547,040 | 10/1985 | Yamamoto et al. | 350/96.34 |
| 4,593,815 | 6/1986 | Wright | 206/389 |
| 4,642,265 | 2/1987 | Suzuki | 428/375 |
| 4,699,451 | 10/1987 | Mohr | 350/96.15 |
| 4,768,856 | 9/1988 | Hofmann et al. | 350/96.10 X |
| 4,883,337 | 11/1989 | Dahlgren | 350/96.29 |
| 4,950,049 | 8/1990 | Darsey et al. | 350/96.30 |
| 4,955,688 | 9/1990 | Chapin et al. | 350/96.23 X |

FOREIGN PATENT DOCUMENTS

| | | |
|---|---|---|
| 0385682A2 | 9/1990 | European Pat. Off. . |
| 59-144688 | 8/1984 | Japan . |
| 63225552 | 1/1989 | Japan . |
| 741296 | 11/1955 | United Kingdom . |
| 2184563A | 6/1987 | United Kingdom . |

Primary Examiner—John D. Lee
Assistant Examiner—Phan T. Heartney
Attorney, Agent, or Firm—Gary L. Griswold; Walter N. Kirn; Stephen W. Buckingham

[57] ABSTRACT

A coil of optical fiber can be self-supporting by bearing a layer of brittle thermoplastic adhesive that adheres adjacent convolutions of the fiber together. Because it is self-supporting, the coil needs no hub so that either end of the fiber can be unwound. Preferred thermoplastic adhesives are marketed in the optical industry as blocking waxes.

10 Claims, 2 Drawing Sheets

SELF-SUPPORTING COIL OF OPTICAL FIBER AND METHOD OF FORMING THE COIL

BACKGROUND OF THE INVENTION

1. Field of the Invention

The invention is concerned with the packaging of optical fibers, especially optical sensor fibers, both for shipment and in a form convenient for use.

2. Description of the Related Art

As is pointed out in U.S. Pat. No. 4,432,607 (Levy):

"Optical fibers require protective coatings in order to preserve fiber strength and to protect the fiber from microbending induced optical loss. The coating is generally applied in-line with fiber drawing by passing the fiber through a reservoir containing the coating material and having an exit orifice which has been sized to apply some desired thickness of the material ... Classes of materials which have been applied to optical fibers by this technique include ultraviolet (UV) curables, thermal curables, solvent-based materials, and hot melts" (col. 1, lines 9-22).

The Levy patent discusses problems of achieving a coating of sufficient toughness, abrasion resistance, adhesion to the fiber, and thickness within the time and space available while also realizing a useful lifetime in the reservoir. These problems are said to be eliminated by a hot-melt optical fiber coating material based on a block copolymer.

U.S. Pat. No. 4,642,265 (Suzuki) says that optical communication glass fibers are normally protected by a resin of relatively low Young's modulus overcoated with a resin of relatively high Young's modulus, but that the inner coating often had been difficult to remove to make connections. The Suzuki patent answers this problem with a special silicone inner coating covered with a thermoplastic resin material.

U.S. Pat. No. 4,351,657 (Kimura et al.) teaches a special method of applying a coating of thermoplastic resin to an optical fiber in-line with the drawing of the fiber, which method can be used at very high line speeds. In order to improve the tensile strength of the optical fiber, a silane coupling agent may be applied ahead of the thermoplastic coating.

Protectively coated optical fibers like those of the above-discussed patents typically are level-wound on spools for storage and shipment, usually under considerable tension. When an optical fiber is to be used while on a spool, e.g., in a gyro, it is wound loosely to avoid attenuation due to tension. While being loosely wound, the fiber is often coated with a resin that bonds adjacent convolutions together by curing quickly upon exposure to ultraviolet radiation, thus preventing the fiber from cascading or becoming entangled when the spool is handled. The resulting coils are self-supporting and sometimes have been supplied on collapsible spools to permit either end of a coil to be unwound and fit into connectors or otherwise connected into an opto-electronic system. The ultraviolet curing required the coil to be wound at very low speeds, and unwinding also was necessarily slow to avoid damaging the optical fiber.

SUMMARY OF THE INVENTION

The invention provides an optical fiber package that can be shipped in ordinary commerce without cascading or tangling and permits either end of the fiber to be unwound from the package, even at high speeds. The optical fiber package of the invention is a self-supporting coil of optical fiber bearing a layer of brittle thermoplastic adhesive that adheres adjacent convolutions of the fiber together.

The self-supporting coil can be formed by winding the resin-bearing optical fiber onto a spool and heating to cause the thermoplatic resin to adhere adjacent convolutions together. When the spool is collapsible, it may be removed, because the coil is self-supporting and can be handled and put to use without the spool. For many uses, the coil can be permanently left on the spool, but removal of the spool makes it easier to unwrap the coil at its inner end.

By "brittle" is meant that the thermoplastic adhesive breaks without substantial deformation. Preferably the thermoplastic adhesive has an elongation at break of less than 20%. Elongations of materials including thermoplastic adhesives are reported in Plastics, Ed. 8 (D.A.T.A., Inc., San Diego, Calif.). Because the thermoplastic adhesive is brittle, the optical fiber can be unwound from a self-supporting coil at high speed and put to any use, e.g., by being rewound into a coil of a different size. The coil can be made self-supporting either by heating the optical fiber to make the brittle resin tacky as it contacts underlying convolutions or by heating the completed coil to fuse the brittle resin.

By "thin" is meant that the thickness of the layer of brittle thermoplastic adhesive is not more than 25% of the diameter of the underlying optical fiber including any protective layer. Preferably, the thickness of the layer of brittle thermoplastic adhesive is from 1 to 5% of said diameter. If it were substantially thinner than that range, the coil when unsupported might accidentally collapse upon being handled, whereas a thermoplastic adhesive layer substantially thicker than that range would be wasteful of raw material.

When a coil of optical fiber is to be rewound before being put to use, the winding can be under tension, and its resin does not need to be fused into a self-sustaining coil. However, when it is desired to wind the optical fiber loosely to keep it free from tension, the layer of brittle resin preferably is heated to make the coil self-supporting to prevent cascading and tangling. If, in doing so, tension is accidentally applied, the tension can usually be relieved simply by softening the thermoplastic adhesive, preferably while transmitting signals over the fiber to sense when the tension has been relieved.

When a self-supporting coil of optical fiber of the invention is to be used without being unwound, it preferably is loosely wound and immediately made self-supporting in order to prevent cascading and tangling during handling and shipment. A self-supporting coil of optical fiber of the invention can be used in that form by unwinding its ends and fitting them into connectors or otherwise connecting them into an opto-electronic system. Instead, a self-supporting coil can be used as a source of lengths of optical fibers, e.g., by installers or repairers of telecommunication systems. The brittle thermoplastic adhesive coating also permits the optical fiber to be temporarily tacked to an object such as a transceiver assembly simply by heating it with a hot-air gun or by applying a solvent to the thermoplastic adhesive coating.

DETAILED DISCLOSURE

The layer of brittle thermoplastic adhesive can be continuously applied from solution or from emulsion or from a melt. By coating from a melt, there is no need either for drying or for a separate heating step to fuse the adhesive after it has been wound onto a spool. The continuously applied adhesive layer can be continuous or discontinuous, e.g., a spiral strip or a dashed coating.

Preferred brittle thermoplastic adhesives for the outer coating are currently being used in the optical industry as blocking waxes for mounting specimens to be polished or fabricated.

THE DRAWING

The invention may be more easily understood in reference to the drawing, both figures of which are schematic. In the drawing.

Figure 1:
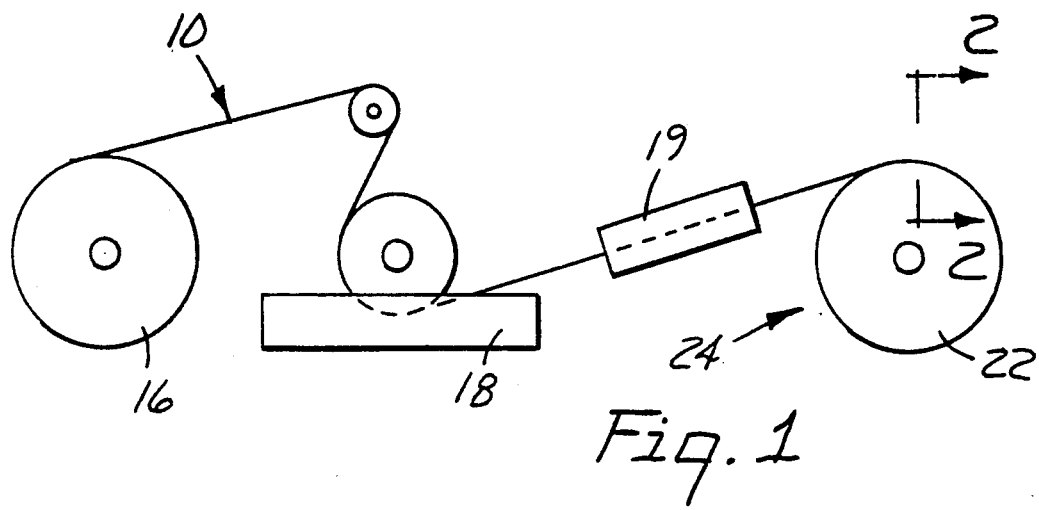
FIG. 1 shows a method of forming a self-supporting coil of optical fiber according to the invention.
Figure 2:
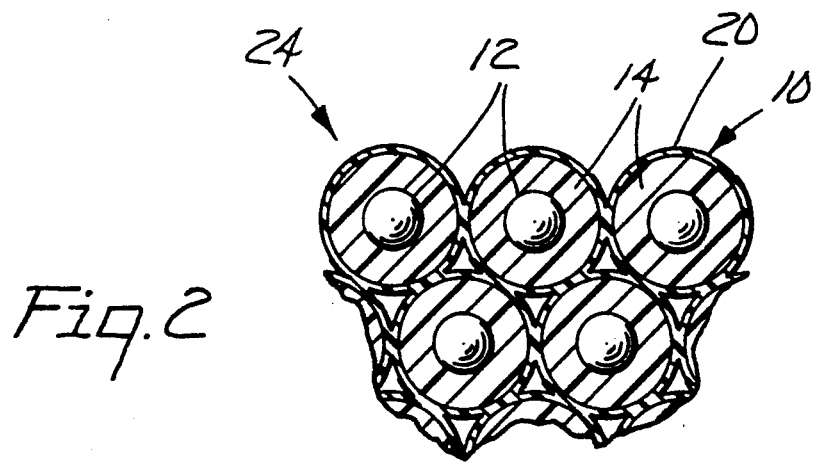
FIG. 2 is a cross section through the coil of FIG. 1, greatly enlarged.

An optical fiber 10 has, as shown in FIG. 2, a glass core-cladding 12 over which has been applied an inner coating of a resin of relatively low Young's modulus and an outer coating of a resin of relatively high Young's modulus as in the Suzuki patent, thus providing a protective resin layer 14. In FIG. 1, the optical fiber 10 is shown being unwound from a supply reel 16 and drawn through a bath 18 at which a thin coating of thermoplastic adhesive is applied from solution. Because the coating is thin, the solvent volatilizes almost immediately, but the rate of evaporation is increased by passing the coated fiber through a tubular oven 19. The coating is thus hardened to a tack-free, brittle thermoplastic adhesive layer 20 before the coated fiber is level-wound onto a spool 22. The resulting coil 24 can be made self-supporting by heating it, e.g., in an oven (not shown).

As shown in FIG. 2, the layer 20 of brittle thermoplastic adhesive after being fused by heat binds adjacent convolutions of the fiber together. After removing the spool 22, both the inner end and the outer end of the coil 24 are free to be unwound.

Figure 3:
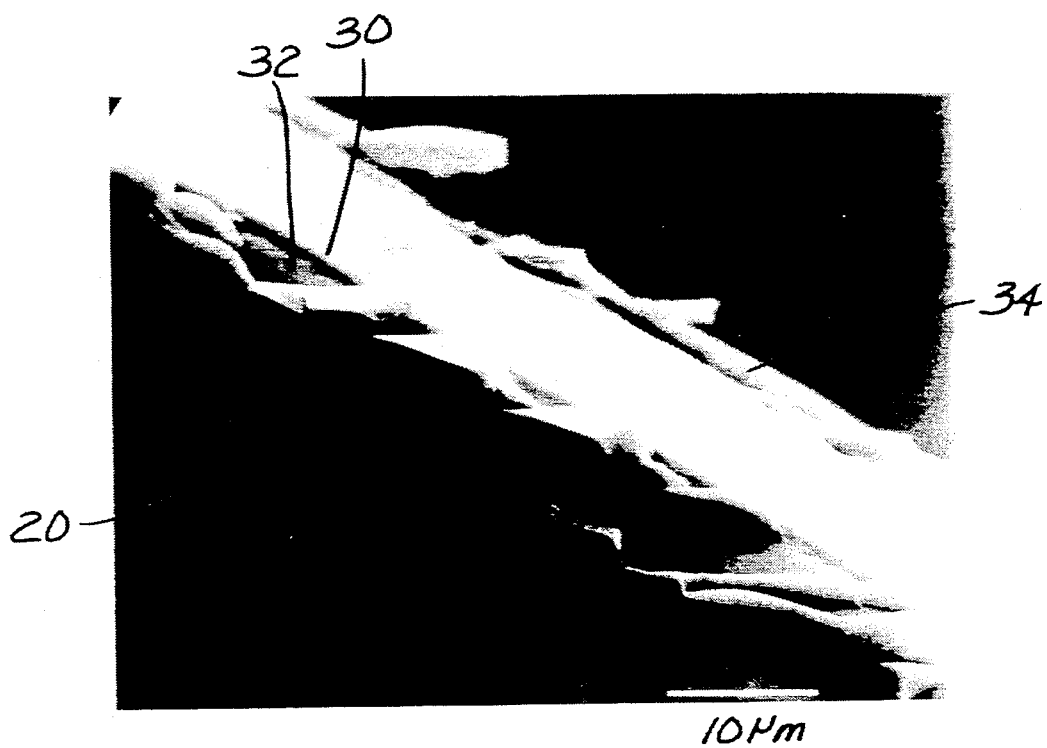
FIG. 3 is a fragmentary photomicrograph of the thermoplastic adhesive layer of an optical fiber after it had been unwound from a self-supporting coil.

The photomicrograph of FIG. 3 shows that the thermoplastic adhesive layer 20 has fractured at 30 where it has separated from an adjacent convolution. The fillet 32 and 34 at each side of that fracture has fractured sharply, leaving some of the thermoplastic adhesive of each fillet on each of the optical fiber and said adjacent convolution.

EXAMPLE 1

A self-supporting coil of optical fiber of the invention has been made using a glass optical fiber having a siliceous core-cladding 80 μm in diameter covered by a dual-layer protective resin coating 200 μm in diameter. This protectively coated fiber was passed through a dip bath which contained a solution of 6.8 g of a brittle thermoplastic adhesive (#70C thermoplastic cement from Hugh Courtwright, Chicago, Ill.) in 80 ml of methanol. An eight-foot (2.5-m) distance was established between the pay-off and take-up spools to allow the solvent to evaporate. The fiber was passed through the solution and onto the take-up spool at 7 meters per minute.

400 meters of the coated fiber was unwound from the take-up spool and level wound at high speed onto a collapsable hub and placed in a 115° C. oven for 5 minutes. Upon removal from the oven and allowing the resin to cool, the hub was removed to yield a self-supporting coil that could be handled repeatedly without delaminating. The thickness of the brittle thermoplastic adhesive covering the optical fiber was about 5 μm.

Each end of the hubless coil could be unwound without any damage to the fiber. A length of the fiber was unwound and rewound onto another collapsible hub and placed in a 115° C. oven for 5 minutes. The resulting coil was self-supporting when its hub was removed.

The self-supporting coil was carefully pulled apart by hand by expanding it in its axial direction. It was then pushed back together onto its hub and placed in a 115° C. oven for 5 minutes, thus again making the coil self-supporting.

EXAMPLE 2

A self-supporting coil of optical fiber was made as in Example 1 except that the thermoplastic adhesive was #30C from Universal Photonics, Inc., Hicksville, N.Y. which indicates it to be a blend of a polyterpene and a copolymer of vinyltoluene and alpha-methylstyrene. After removing the hub to provide a self-supporting coil, a length was unwound from each end and rewound on another collapsible hub and heated to provide self-supporting coils.

It is understood that the #70C thermoplastic adhesive of Example 1 had been specifically formulated for Hugh Courtwright by Universal Photonics and is chemically similar to the #30C adhesive of Example 2.

What is claimed is:

1. A coil of optical fiber that is self-supporting by having a layer of a brittle thermoplastic adhesive that adheres adjacent convolutions of the fiber together, such that the coil has no hub and either end of the fiber can be unwound.

2. A coil of optical fiber as defined in claim 1 which is wound on a spool.

3. A coil of optical fiber as defined in claim 2 wherein the spool is collapsible to permit each end of the coil to be freely unwound.

4. A coil of optical fiber as defined in claim 1 wherein the fiber has a diameter and the brittle thermoplastic adhesive layer has a thickness that is not greater than 25% of the diameter of the fiber.

5. A coil of optical fiber as defined in claim 4 wherein the thickness of the brittle thermoplastic adhesive layer is from 1 to 5% of the diameter of the fiber.

6. A coil of optical fiber as defined in claim 1 wherein the brittle thermoplastic adhesive fractures sharply when the coil is unwound.

7. A coil of optical fiber as defined in claim 1 wherein the thermoplastic adhesive has an elongation at break of less than 20%.

8. Method of forming a self-supporting coil of optical fiber, said method comprising the steps of
a) continuously applying to the optical fiber a layer of brittle thermoplastic adhesive,
b) winding the adhesive-bearing optical fiber onto a spool,
c) fusing the thermoplastic adhesive to bind adjacent convolutions of the fiber together as a self-supporting coil, and
removing the spool.

9. Method as defined in claim 8 wherein said spool is collapsible, said method comprising the additional step of collapsing the spool to leave an unsupported coil from which either end of the optical fiber can be unwound.

10. Method as defined in claim 8, said method comprising the additional steps of unwinding a length of the fiber from said spool, winding that length onto a second spool, and fusing the thermoplastic adhesive to bind adjacent convolutions of the rewound coil together to make that coil self-supporting.

* * * * *

UNITED STATES PATENT AND TRADEMARK OFFICE
CERTIFICATE OF CORRECTION

PATENT NO. : 5,179,613
DATED : Jan. 12, 1993
INVENTOR(S) : Cronk

It is certified that error appears in the above-indentified patent and that said Letters Patent is hereby corrected as shown below:

Col. 4, line 65, Insert --d)-- before "removing the spool."

Signed and Sealed this

Third Day of January, 1995

Attest:

BRUCE LEHMAN

Attesting Officer

Commissioner of Patents and Trademarks